United States Patent
Kawabe et al.

(10) Patent No.: US 6,329,076 B1
(45) Date of Patent: Dec. 11, 2001

(54) HYDROGEN STORAGE MATERIAL AND MANUFACTURING METHOD OF THE SAME

(75) Inventors: Nozomu Kawabe; Kouichi Sogabe; Shousaku Yamanaka; Yoshinobu Takeda; Takashi Uemura, all of Itami (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/762,980

(22) PCT Filed: Jun. 7, 2000

(86) PCT No.: PCT/JP00/03710

§ 371 Date: Feb. 14, 2001

§ 102(e) Date: Feb. 14, 2001

(87) PCT Pub. No.: WO01/06024

PCT Pub. Date: Jan. 25, 2001

(30) Foreign Application Priority Data

Jul. 16, 1999 (JP) .................................................. 11-203360

(51) Int. Cl.[7] ................ B32B 15/00; B22F 3/02
(52) U.S. Cl. .................. 428/656; 419/61; 420/590; 420/900; 428/649; 428/660; 428/668; 428/926; 428/940
(58) Field of Search ..................... 428/656, 649, 428/660, 668, 926, 940; 420/590, 900; 419/61

(56) References Cited

FOREIGN PATENT DOCUMENTS

| | | |
|---|---|---|
| 51 148634 | 12/1976 | (JP) . |
| 62 191402 | 8/1987 | (JP) . |
| 01 131001 | 5/1989 | (JP) . |
| 07 041808 | 2/1995 | (JP) . |
| 07 054068 | 2/1995 | (JP) . |
| 09 059001 | 3/1997 | (JP) . |
| WO 00/77266 | 12/2000 | (WO) . |

OTHER PUBLICATIONS

New Development of Hydrogen Storage Alloy—Improved Performance with Nano–Composition Technology–; Boundary 1996.4; pp. 36 to 41. (no month given).

Kouichi Sogabe et al.; Hydrogen Storage Laminated Material; U. S. Patent Application No.: 09/762,426; Filed: Feb. 6, 2001.

New Development of Hydrogen Storage Alloy—Improved Performance with Nano–Composition Technology –; Boundary 1996.4, (Partial Translation) vol. 12, pp. 36–41 by M. Orishige et al. (no month given).

Primary Examiner—Robert R. Koehler
(74) Attorney, Agent, or Firm—W. F. Fasse; W. G. Fasse

(57) ABSTRACT

A hydrogen storage material (1) having excellent hydrogen storage capability and having such a low hydrogen desorption temperature as not to significantly hinder the use thereof, and also capable of being mass-produced, and a manufacturing method of the same can be obtained. The hydrogen storage material has a layered deformation structure including plastic deformation, and one layer (2) of the layered deformation structure is formed from an alloy or compound including an element of groups 2A, 3A and 4A or an element of at least one of the groups 2A, 3A and 4A, and another layer (3) being in contact with the one layer is formed from an alloy or compound including an element of groups 6A, 7A and 8A or an element of at least one of the groups 6A, 7A and 8A.

8 Claims, 2 Drawing Sheets

HYDROGEN STORAGE MATERIAL AND MANUFACTURING METHOD OF THE SAME

TECHNICAL FIELD

The present invention relates to a hydrogen storage material, and more particularly, relates to a hydrogen storage material having excellent hydrogen storage capability and also a reduced hydrogen desorption temperature, and a manufacturing method of the same.

BACKGROUND ART

With growing interest in the hydrogen energy systems, research and development of the hydrogen storage materials have been actively conducted searching for materials for use in storage and transport of hydrogen, separation and refinement of hydrogen gas, energy conversion apparatuses, and the like. The research and development has shown that the hydrogen storage materials subjected to repeated hydrogen absorption and desorption are pulverized in a crumbling manner. Thus, materials having excellent hydrogen storage capability and also being highly resistant to pulverization resulting from the repeated absorption and desorption of hydrogen have been strongly demanded. In response to this, a proposal has been made to recommend a material having a thin-film laminated structure formed from a group 4A metal and any one of the group 6A, 7A and 8A metals (Japanese Laid-Open Publication No. 9-59001). Such a laminated, thin film body has a highly increased resistance to pulverization resulting from absorption and desorption of hydrogen. Moreover, since the group 4A metals having an hcp structure in the state of a bulk material have a bcc structure in the thin-film, laminated structure, the number of interstitial sites that may store hydrogen is increased. Since the group 4A metals originally have strong bonding power with hydrogen and thus have high hydrogen absorbing capability, the increased interstitial site density results in increased hydrogen storage capability. Accordingly, materials being less susceptible to pulverization and having extremely high hydrogen storage capability can be obtained from the above-mentioned material having a thin-film, laminated structure formed from a group 4A metal and any one of the group 6A, 7A and 8A metals.

However, the above-mentioned thin-film, laminated material includes a group 4A element, Ti, and therefore is heavy in weight. Moreover, mass production of the thin-film, laminated material is restricted in terms of resources, thereby necessarily making the material highly expensive beyond the price suitable for practical use, as an industrial material of this type. Accordingly, an element alternative to the group 4A metals had been sought. As a result, it was found that the group 2A and 3A metals have the capability similar to that of the group 4A metals in terms of the hydrogen storage capability, and a hydrogen storage laminated material was proposed which has a group 2A or 3A metal substituted for a group 4A metal (Japanese Patent Application No. 11-165890). For example, Mg of the group 2A elements is rich in resources and also light in weight. Therefore, it has become possible to obtain an inexpensive, lightweight laminated material being less susceptible to pulverization and also having excellent hydrogen storage capability.

It is an object of the present invention to provide a hydrogen storage material having high hydrogen storage capability and also having such a low hydrogen desorption temperature as not to significantly hinder the daily, easy use of the nickel-hydrogen secondary batteries, hydrogen-utilizing fuel cells, hydrogen-utilizing energy conversion systems and the like, and more specifically, as low as 150° C. or less, and capable of being mass-produced, and a manufacturing method of the same.

DISCLOSURE OF INVENTION

A hydrogen storage material of the present invention includes a layered deformation structure formed in a starting material subjected to plastic deformation, wherein one layer of the layered deformation structure is formed from an alloy or compound including an element of groups 2A, 3A and 4A or an element of at least one of the groups 2A, 3A and 4A, and another layer being in contact with the one layer is formed from an alloy or compound including an element of groups GA, 7A and 8A or an element of at least one of the groups 6A, 7A and 8A.

With this layered deformation structure, contact between one layer and another layer is assured, and one layer is likely to include a bcc crystal structure, whereby the interstitial site density for storing hydrogen can be increased. Moreover, since the layered deformation structure is realized by plastic deformation, defects such as dislocations and lamination defects are formed at a high density, so that hydrogen is trapped in the defect portions, resulting in improved hydrogen storage capability. Moreover, since the defect portions serve as a fast hydrogen diffusion path, formation of the defect portions at a high density significantly reduces the hydrogen desorption temperature. In addition, since the hydrogen storage material can be manufactured by processing means such as rolling, a practically required amount on the order of tons can be produced in a short period with high efficiency.

Note that, the layered deformation structure refers to the structure formed from laminated dissimilar materials subjected to strong deformation working involving plastic deformation as shown in FIGS. 1 and 2, and is different from the structure shown in FIG. 3 that is conventionally known as a laminated structure. In the structure shown in FIG. 1, each layer extends uniformly in the rolling, wire-drawing direction, whereas in the structure shown in FIG. 2, a portion where each layer extends uniformly is randomly folded.

In the case where fast diffusion of the hydrogen atoms in the defect portions is important, or otherwise, the above-mentioned hydrogen storage material has a defect density resulting from such strong deformation working that causes a half-band width of at least one of main diffraction peaks in an X-ray diffraction pattern of the layered deformation structure to be 0.2° or more.

The density of defects such as dislocations and lamination defects can be evaluated by the half-band width of an X-ray diffraction peak. Normally, in order to increase the hydrogen diffusion velocity, the half-band width is 0.2° or more, preferably 0.5° or more, and most preferably 1° or more. Impurity segregation is likely to occur in the defect portions, and such impurity segregation results in biased charges. These biased charges are considered to have a function to attract and trap hydrogen. In order to clearly induce this hydrogen trapping function, the half-band width is preferably 0.5° or more. However, it is not necessarily desirable to increase the half-band width, and it is not preferable that the strong deformation working causes an amorphous state, i.e., the state where X-ray diffraction does not have clear diffraction peaks. In the amorphous state, the bond structure forming the crystal structure is disconnected, and the hydrogen atoms are strongly trapped in this disconnected bond structure. Therefore, the hydrogen storage capacity is increased, but the amount of hydrogen capable of being desorbed at a practical temperature is significantly reduced. Note that the main diffraction peaks refer to the highest three peaks among the diffraction peaks of a material that is to be subjected to the X-ray diffraction. Alternatively, in the case of a material having many diffraction peaks, the main diffraction peaks may refer to the highest five peaks, instead of the highest three peaks. A half-band width can be easily read on the chart. However, a diffraction peak that already has a half-band width of 0.2° or more before plastic working is excluded from the measurement. Alloys having precipitations produced therein and the like have a diffraction line with a half-band width of 0.2° or more. Accordingly, such a diffraction line is excluded from the measurement.

In the case where it is important in the above-mentioned hydrogen storage material to assure a large contact area between one layer and another layer and obtain a high defect density, or otherwise, one layer of the layered deformation structure has a thickness of 10 nm or less.

Reduction in thickness of one layer of the layered deformation structure means strong deformation working involving plastic deformation, and also means elimination of the automorphic function due to the reduced thickness, i.e., elimination of the capability to form an originally stable crystal structure (such as a phenomenon of easy phase transition from hexagonal to cubic), formation of a fast hydrogen diffusion path and production of high-density defects serving as a hydrogen trapping source. Moreover, a large contact area can be assured between one layer and another layer. More specifically, the thickness of one layer of the layered deformation structure can be used as an index of a high defect density and large contact area. This thickness indicates an average thickness of the thickest portions of each layer. In the case where two one layers are continuously formed, measurement is conducted considering that these two layers are separated at the surface of one of the two layers. The thickness exceeding 10 nm results in an insufficient defect density and contact area, and thus results in an insufficient hydrogen storage capacity, so that the hydrogen desorption temperature exceeds the practical value. A thin film sample is obtained which has the cross section in the direction perpendicular to the processing direction as its surface. The thickness of the sample is measured with a transmission electron microscope (TEM) for ten fields or more, at least at ten positions per field, whereby an average thickness of one layers is obtained. In the case of the powder subjected to mechanical alloying having an unclear processing direction, the above-mentioned thickness is obtained by statistical processing of the measurements of ten fields or more, at ten positions or more per field.

A method for manufacturing a hydrogen storage material according to the present invention includes the step of conducting strong deformation working involving plastic deformation to a starting material including: one or more materials selected from alloys or compounds including an element of groups 2A, 3A and 4A or an element of at least one of the groups 2A, 3A and 4A; and one or more materials selected from alloys or compounds including an element of groups 6A, 7A and 8A or an element of at least one of the groups 6A, 7A and 8A.

The strong deformation working involving plastic deformation introduces defects such as dislocations and lamination defects into the crystal lattice. As the number of times of the processing is increased, the dislocations, lamination defects and the like transition into the state where the defects are accumulated in a tangled manner. These defect-accumulated portions improve the hydrogen diffusion velocity, and function as a fast hydrogen diffusion path. Moreover, impurity segregation is likely to occur in the defects, and such impurity segregation induces biased charges. The biased charge portions function as hydrogen-atom trapping sites, and therefore increase the hydrogen storage capacity itself. Moreover, the strong deformation working involving plastic deformation increases the contact area between one layer and another layer in the layered deformation structure, and one layer is likely to include a bcc structure. If the bcc structure is included, the density of interstitial sites for storing hydrogen atoms is increased, whereby the hydrogen storage capability is enhanced.

In the above-mentioned method for manufacturing a hydrogen storage material, in the case where it is important to increase the defect density to a prescribed value or more and to sufficiently reduce the thickness of each constituent layer of the layered deformation structure, or otherwise, the material subjected to the strong deformation working involving plastic deformation is again laminated to form a starting material, and the starting material is further subjected to strong deformation working involving plastic deformation.

The above-mentioned method allows the material to be effectively subjected to large plastic deformation.

In the above-mentioned method for manufacturing a hydrogen storage material, in the case where the layered deformation structure is not likely to be formed after the material was formed into a plate or line shape, or otherwise, the starting material is in a form of powder or pellet. The starting material is enclosed in a ductile pipe, and the resultant pipe is formed into a plate or line shape, and subjected to the strong deformation working. Alternatively, the strong deformation working involving plastic deformation is conducted by mechanical alloying.

The mechanical alloying causes the layered deformation structure to be formed at the surface or into the inside of the material in the powder state. Therefore, a preforming body can be made from this powder, and processed into a desired shape. As a result, a component having both high hydrogen storage capability and low hydrogen desorption temperature can be obtained without restriction on the shape.

In the above-mentioned method for manufacturing a hydrogen storage material, in the case where the temperature rises or annealing is conducted during plastic deformation, or otherwise, the strong deformation working involving plastic deformation, or annealing is conducted in a temperature range corresponding to 80% or less of a melting point of a material selected as the starting material.

If the temperature exceeds 80% of the melting point, alloying progresses between the dissimilar layers, whereby the intention to make the dissimilar materials in contact with each other is hindered. The melting point as used herein generally indicates the melting point of a material having a higher melting point out of the dissimilar materials. However, in the case where a high-melting-point material is selectively diffused into a low-melting-point material, the melting point of the low-melting-point material may be possible in order to reduce the diffusion driving force in terms of prevention of the progress in alloying. Moreover, if the temperature exceeds 80% of the melting point, the density of dislocations and lamination defects is reduced, so that the hydrogen storage capability is not degraded and also the hydrogen desorption temperature is not reduced. Note that the melting point is indicated in centigrade ° C., and the above-mentioned temperature range indicates a temperature in centigrade ° C. that is equal to or lower than 80% of the melting point in centigrade ° C.

Figure 1:
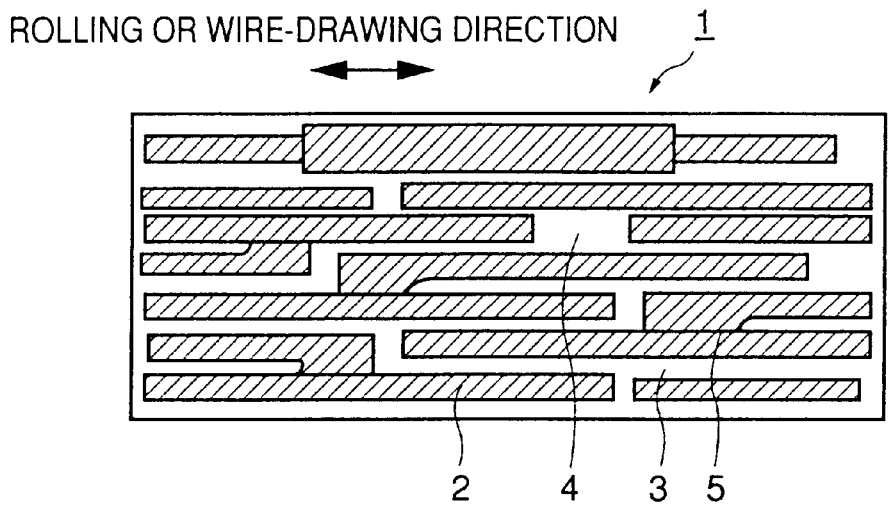
FIG. 1 is a schematic diagram showing one layered deformation structure recognized in a hydrogen storage material of the present invention.

BEST MODE FOR CARRYING OUT THE INVENTION (Embodiment 1: Rolling)

First, Embodiment 1 will be described in which a layered deformation structure according to the present invention is formed by rolling. Combinations of one of the group 2A, 3A and 4A metals and one of the group 6A, 7A and 8A metals as shown in Present Example Nos. 1 to 12 of Table 1 were used. One of the group 2A, 3A and 4A metals is herein referred to as one layer, and one of the group 6A, 7A and 8A metals is herein referred to as another layer, but one layer and another layer are not necessarily alternately, regularly arranged. The arrangement is not regular in a portion where one layer is severed due to strong deformation working. In the following description, the group 2A, 3A and 4A metals are referred to as L-type metals, and the group 6A, 7A and 8A metals are referred to as H-type metals. Examples such as combinations of layers respectively formed from two of the H-type metals and a layer formed from one of the L-type metals which is interposed therebetween, as shown in Present Examples Nos. 13 to 17, were used. For example, for No. 13, the combination shown in Table 1 is repeated, so that the H-type metal layers are in contact with each other at the boundary between the repeated combinations. Among Nos. 13 to 17, Present Example No. 15 is formed from layers of two metals: an L-type metal and an H-type metal, wherein Ms-Si compound (magnesium silicide) is used as the L-type metal.

Hereinafter, a method for manufacturing specimens of Present Examples Nos. 1 to 12 will be described. A plate of a single L-type metal having a thickness of 1 mm was pickled, and then annealed in high temperature vacuum so as to sufficiently remove a surface oxide film into a clean surface. The step of removing the surface oxide film may be conducted only by pickling, or may be conducted by annealing in hydrogen or Ar atmosphere without conducting pickling. Alternatively, the surface oxide film may be removed by machine cutting. Then, a plate of a single H-type metal having a thickness of 1 mm was subjected to the same treatment, and then a surface oxide film was similarly removed into a clean surface. Thereafter, the resultant surface-cleaned plates are alternately laminated one by one into a laminated body of 20 plates in total (nominal thickness: 20 mm). Using this laminated body as a rolling material, multi-pass rolling was conducted with a rolling reduction ratio of 10% to 50% per pass. Heating was not conducted before rolling, and the processing speed and inter-pass time interval were adjusted such that the temperature did not exceed 300° C. during rolling due to the processing heat.

The thickness of the laminated body was measured after each roll pass. At the thickness of 10 mm, the laminated body was severed at the center such that the length in the rolling direction was halved. Impurities such as surface lubricating oil adhering to the surface of each laminated body were removed by pickling and annealing in high temperature vacuum. These halved, surface-cleaned laminated bodies were further laminated into a rolling material having a nominal thickness of 20 mm, and rolling was again repeated. This process of rolling, severing, surface cleaning and formation of the laminated body as a rolling material were repeated 15 times or more in total, or 20 times or more depending on the specimens, so that the thickness of each layer fell in the range of 1 to 10 nm. Note that two laminated bodies each having a thickness of 10 mm before lamination were laminated this time. Practically, however, the thickness may be greater than or smaller than 10 mm, and the same effects can be obtained even if two or more laminated bodies are laminated. In the case where significant breakage occurred during rolling, annealing was conducted so as to improve processability. However, the annealing temperature must be equal to or lower than the temperature that does not induce diffusion between the L-type metal layer and the M-type metal layer, for example, 300° C. or less.

TABLE 1

| | Material Combination | Hydrogen Storage Capacity (H/M) | XRD Peak Showing bcc Structure | Defects |
|---|---|---|---|---|
| Present Example | | | | |
| 1 | Ti/Cr | 3.0 | Exist | Exist |
| 2 | Ti/Ni | 2.5 | None | Exist |
| 3 | Ti/Fe | 2.5 | Exist | Exist |
| 4 | Mg/Cr | 2.5 | Exist | Exist |
| 5 | Mg/Ni | 2.5 | None | Exist |
| 6 | Ca.Mg/Cr | 2.5 | Exist | Exist |
| 7 | Y/Ni | 3.0 | None | Exist |
| 8 | Y/Cr | 2.5 | Exist | Exist |
| 9 | La/Ni | 2.5 | None | Exist |
| 10 | La/Cr | 2.5 | Exist | Exist |
| 11 | Yb/Ni | 2.5 | Exist | Exist |
| 12 | Yb/Cr | 2.5 | Exist | Exist |
| 13 | Cr/Mg/Ni | 3.0 | Exist | Exist |
| 14 | Ti/Mg/Ni | 3.0 | None | Exist |
| 15 | Mg—Si/Ni | 2.0 | Exist | Exist |
| 16 | Mg/Cr/Ti | 2.5 | Exist | Exist |
| 17 | Fe/Mg/Cr | 2.0 | Exist | Exist |
| Comparative Example | | | | |
| 18 | MgNi$_5$ | 1.5 | None | None |
| 19 | CaNi$_5$ | 1.0 | None | None |
| 20 | LaNi$_5$ | 1.0 | None | None |
| 21 | LaCr$_5$ | 0.5 | None | None |

Figure 4:
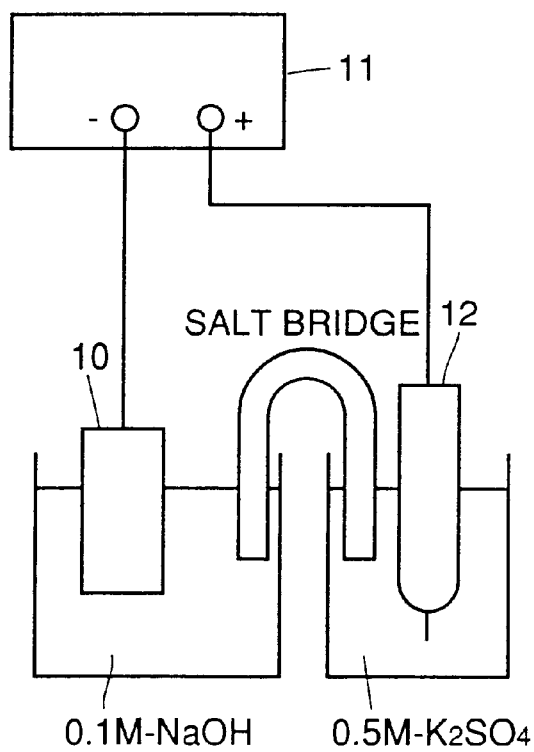
FIG. 4 is a schematic diagram showing the structure of an apparatus for realizing hydrogen storage treatment.

The specimens of Present Example Nos. 13 to 17 of Table 1 are basically made by the same method as the above-described rolling method except that the laminated body as a rolling material is formed from three types of thin plates. However, Present Example No. 15 is formed from two types of thin plates, one of them being Mg-Si compound (magnesium silicide). A thin film was cut out as a hydrogen storage specimen from the specimen made by the above-described method. This hydrogen storage specimen was subjected to hydrogen storage treatment by an electrolytic charge method. An apparatus for conducting the hydrogen storage treatment is shown in FIG. 4. Referring to FIG. 4, in conducting the hydrogen storage treatment, a specimen 10 was soaked in a 0.1 M NaOH solution and a Pt counter electrode 12 was soaked in a 0.5 M K$_2$SO$_4$ solution. A negative current was applied to the specimen 10, whereas a positive current was applied to the Pt counter electrode 12, both for a predetermined time period by means of a constant-current power supply 11. TR6120A made by Advantest was used as the constant-current power supply 11. Note that the current value was basically 10 mA, and the current application time was set to one hour. A value as given by current (A)×time (s) corresponds to the quantity of electricity, and this value was used to calculate the hydrogen generation amount by the electrolysis based on Faraday's law. Measurement of stored hydrogen was conducted with EMGA621 made by Horiba. This apparatus is capable of conducting any one of hydrogen absolute quantity analysis and temperature-programmed analysis. Specifically, the hydrogen storage capacity was obtained by the following method: first, the specimen is warmed up, and hydrogen leaving the specimen is quantified by gas analysis. Subsequently, the specimen having discharged hydrogen is dissolved in acid, and the specimen is quantified by chemical analysis. H/M was obtained from both quantitative values. Bulk materials were used in comparative examples.

A sample of the thickness cross section of the plate subjected to the final rolling was cut out, and a thin film was made therefrom for transmission electron microscopic observation (TEM). Moreover, an X-ray diffraction pattern for the thickness cross section was obtained by a 2θ method and analyzed. One purpose of obtaining the X-ray diffraction pattern is to examine whether or not an L-type metal having an hcp structure in the bulk material partially includes a bcc structure in the layered deformation structure. Another purpose is to measure the half-band width of an appropriate diffraction peak and thereby determine whether or not the high-density defects such as dislocations or lamination defects introduced by plastic working such as rolling still remain in the final state. In Table 1, defect determination was conducted as follows: for the samples prior to the hydrogen storage treatment, the half-band width of a clearly recognized, attributable X-ray diffraction peak was measured. The samples having a half-band width of 1° or more are denoted with "Exist" in the column "Defects", whereas the samples having a half-band width less than 1° are denoted with "None".

Figure 2:
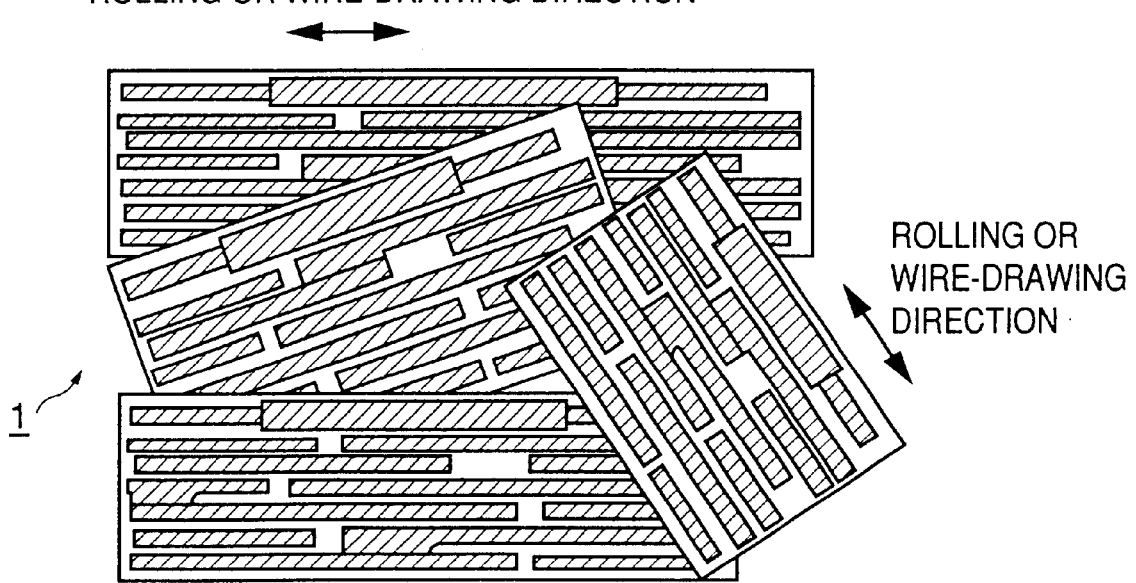
FIG. 2 is a schematic diagram showing another layered deformation structure recognized in a hydrogen storage material of the present invention.
Figure 3:
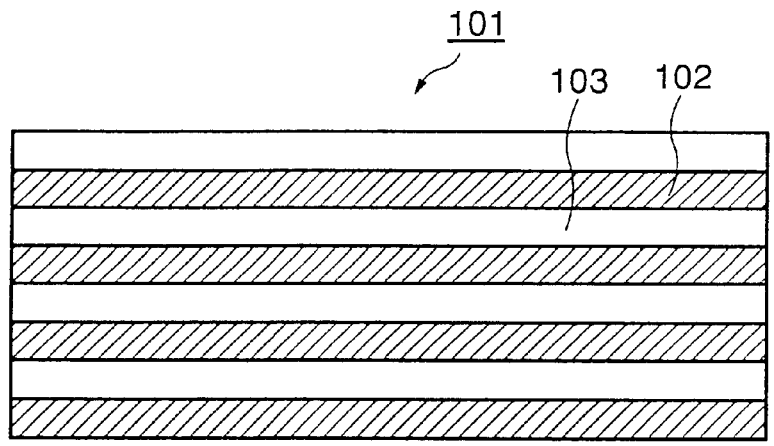
FIG. 3 is a schematic diagram showing a conventional laminated structure.

The test result is shown in Table 1. Every sample of the Present Examples in Table 1 had a layered deformation structure as shown in FIG. 1 or 2 within the same sample. According to the TEM observation, the respective thicknesses of the L-type metal layer and H-type metal layer were not uniform in the plate thickness direction, but were reduced to the range of 10 nm to 1 nm. Referring to FIG. 1, a layered deformation structure 1 includes one layer 2 including an L-type metal element and another layer 3 including an H-type metal element, and each of the layers typically uniformly extend in the processing direction. One layer and another layer are alternately arranged in some portions, but are not necessarily alternate. Another layer is continuously formed in a separated part 4 of one layer. Similarly, one layer is continuously formed in a separated part 5 of another layer. In a part of the sample, a portion having a clear processing direction is folded as shown in FIG. 2, so that the random crystal grains assemble together as a whole. The structure shown in FIG. 2 was often recognized in a portion processed to a high processing degree, such as the ends of the sample, but is not limited to the portion processed to a high processing degree. The layered deformation structure as recognized in the samples of the Present Examples is different from the conventional orderly structure having a uniform thickness shown in FIG. 3. In FIG. 3, a laminated structure 101 is comprised of one layer 102 and another layer 103 both having a uniform thickness. Although these layers extend uniformly in the processing direction with a uniform thickness, such orderly arrangement is not always desirable. For example, the structure shown in FIG. 2 has an improved hydrogen moving speed because the directionality is lost as a whole.

All of Present Examples Nos. 1 to 17 had H/M of 2.0 or more. Nos. 7 to 12 and No. 15 also had H/M of 2.0 or more. Among others, Present Examples Nos. 2, 5, 7, 9 and 14 have a high H/M value because of high-density defects, despite that they do not have a bcc structure. The reason for this is as follows: as described above, impurity segregation is likely to occur in the vicinity of the defects, and such impurity segregation induces biased charges in the vicinity thereof, so that hydrogen atoms are trapped therein.

In the case where strong rolling was conducted like Embodiment 1, a multiplicity of defects are introduced into the crystal. The defects thus introduced transition to a tangled state as the number of processing repetitions is increased. These defects not only improve the hydrogen storage capability as described above, but also serve as a fast hydrogen diffusion path and reduce a hydrogen desorption temperature. The defect density is evaluated by the half-band width of an X-ray diffraction peak. However, since a microcrystalline material on the order of nanometers is not likely to have dislocations in the crystal grains, the defect density as used herein does not necessarily indicate the dislocation density. In order to increase the hydrogen diffusion velocity, the half-band width is 0.2° or more. In order to further increase the hydrogen storage capacity, the half-band width of 0.50 or more is desirable. The Present Examples as denoted with "Exist" in the column "Defects" in Table 1 have a half-band width of 1° or more, and therefore significantly contribute to improvement in H/M.

In addition, Present Example No. 5 of Table 1 (Mg/Ni (molar ratio Mg:Ni=2:1)) was subjected to the temperature-programmed analysis using the above-mentioned EMGA621 made by Horiba, so that the hydrogen desorption rate was obtained under the heating condition of the programming rate of 10° C./min, and compared with that of a bulk material $Mg_2Ni$. In Present Example No. 5, hydrogen desorption was recognized from 50° C., and the desorption rate was maximized at 100° C. On the other hand, the bulk material $Mg_2Ni$ desorbed hydrogen at a temperature of 200° C. to 300° C. Accordingly, by increasing the defect density by such strong deformation working that causes the half-band width of an X-ray diffraction peak to be 1° or more as described above, the hydrogen storage material according to the present invention can be practically used as a hydrogen supply source for the nickel-hydrogen secondary batteries and fuel cells. Unlike a manufacturing method using an ion plating method, this rolling manufacturing method is suitable for mass production, and enables the hydrogen storage material of the present invention to be manufactured on the order of tons with high productivity.

(Embodiment 2: Wire Drawing)

First, Embodiment 2 will be described in which a laminated deformation structure according to the present invention is formed by wire drawing. Combinations of one of the L-type metals and one of the H-type metals as shown in Present Example Nos. 1 to 12 of Table 2 were used. Moreover, examples such as combinations of two of the H-type metals and one of the L-type metals as shown in Present Examples Nos. 13 to 17 were used. However, Present Example No. 15 is formed from plates of two metals: an L-type metal and an H-type metal, wherein Mi-Si compound (magnesium silicide) is used as the L-type metal.

TABLE 2

| | Material Combination | Composition Ratio (Molar Ratio) | Hydrogen Storage Capacity (H/M) | XRD Peak Showing bcc Structure | Defects |
|---|---|---|---|---|---|
| Present Example | | | | | |
| 1 | Ti/Cr | 1:1 | 3.0 | Exist | Exist |
| 2 | Ti/Ni | 2:1 | 2.5 | None | Exist |
| 3 | Ti/Fe | 1:1 | 2.5 | Exist | Exist |
| 4 | Mg/Cr | 2:1 | 2.5 | Exist | Exist |
| 5 | Mg/Ni | 2:1 | 2.5 | None | Exist |
| 6 | Ca.Mg/Cr | 1:1:2 | 2.5 | Exist | Exist |
| 7 | Y/Ni | 1:1 | 2.0 | None | Exist |
| 8 | Y/Cr | 1:1 | 2.5 | Exist | Exist |
| 9 | La/Ni | 1:1 | 2.5 | None | Exist |
| 10 | La/Cr | 1:1 | 2.5 | Exist | Exist |
| 11 | Yb/Ni | 2:1 | 2.5 | Exist | Exist |
| 12 | Yb/Cr | 2:1 | 2.5 | Exist | Exist |
| 13 | Cr/Mg/Ni | 1:2:1 | 2.0 | Exist | Exist |
| 14 | Ti/Mg/Ni | 1:1:1 | 2.0 | None | Exist |
| 15 | Mg—Si/Ni | 2:1:1 | 2.0 | Exist | Exist |
| 16 | Mg/Cr/Ti | 1:1:2 | 2.5 | Exist | Exist |
| 17 | Fe/Mg/Cr | 1:1:1 | 2.0 | Exist | Exist |
| Comparative Example | | | | | |
| 18 | $MgNi_5$ | — | 1.5 | None | None |
| 19 | $CaNi_5$ | — | 1.0 | None | None |
| 20 | $LaNi_5$ | — | 1.0 | None | None |
| 21 | $LaCr_5$ | — | 0.5 | None | None |

Hereinafter, a method for manufacturing the specimens of Present Example Nos. 1 to 12 in Table 2 will be described. Powders of the L-type and H-type metals were prepared at each molar ratio shown in Table 2, and sufficiently uniformly mixed. A copper pipe having an outer diameter of 20 mm and inner diameter of 16 mm was loaded with the resultant mixture. The diameter of each powder was 1 mm or less. The size of the powders is desirably 50 μm or less. Thereafter, the end of the copper pipe was closed, and subjected to wire drawing. The wire drawing was conducted with a roller die, but swaging, drawing with a hole die, or rolling may also be possible. The wire drawing was conducted at the area reduction ratio of 5% to 30% per pass, and the total area reduction ratio was 96% or more. The total area reduction ratio is preferably 99.5% or more. The heat treatment at 300° C. or less during wire drawing would facilitate the processing, and also improve the density due to increased adhesion between the powders. After the processing, copper on the surface of the wire was removed by chemical treatment or machining, whereby the wire formed from the mixed body of the L-type and H-type metals was obtained. Hydrogen specimens for measuring the hydrogen storage capability H/N were cut out from the wires. In addition, X-ray diffraction specimens were made as follows: the cross section of a bundle of a plurality of wires was cut out and embedded into a resin, and the resultant resin was polished. The H/M measurement method and X-ray diffraction method were conducted in the same manner as that of Embodiment 1.

According to the test result shown in Table 2, the Present Examples have a high H/M value of 2.0 or more. Among these, Nos. 2, 5, 7, 9 and 14 have a high H/M value, despite that they do not include a bcc structure in the L-type metal layer. As specifically described in Embodiment 1, this is because of a high defect density. More specifically, in the Present Examples, the half-band width of an X-ray diffraction peak is 1° or more, and therefore dislocations, lamination defects and the like are formed at a high density. On the other hand, the bulk materials of Comparative Example Nos. 18 to 21 have H/M in the range of 0.5 to 1.5. Moreover, Comparative Example Nos. 18 to 21 are susceptible to pulverization as a result of repeated hydrogen absorption and desorption cycles, because they are bulk materials.

In order to understand the effects of the above-mentioned high defect density on the hydrogen desorption temperature, Present Example No. 5 of Table 2 was examined for hydrogen desorption. The examination method is the same as that described in Embodiment 1. As a result, it was found that Present Example No. 5 of Table 2 starts hydrogen desorption from 50° C. and has the maximum desorption rate at 100° C. On the other hand, a bulk material $Mg_2Ni$ desorbed hydrogen at a temperature of 200° C. to 300° C. Accordingly, it was found that the wire drawing also introduces the high-density defects into the hydrogen storage material, and reduces the hydrogen desorption temperature by 100° C. to 200° C. As a result, the hydrogen storage material can be used as a hydrogen supply source for the fuel cells and an electrode of the nickel-hydrogen secondary batteries that are used for articles of daily use. These wires are used directly as wires, or are formed into sheets or the like for use as the electrode of the nickel-hydrogen secondary batteries and the like. The above-described wire drawing enables the hydrogen storage material,of the present invention to be manufactured on the order of tons with high productivity.

(Embodiment 3: Mechanical Alloying)

Using Mg pellets, Ni carbonyl powder and metal chromium powder as materials, the materials were premixed by a V-shaped mixer at the final composition ratio, and then the resultant mixture was subjected to mechanical alloying (MA) for 500 hours by means of a planetary ball mill with Ar gas enclosed therein. The powder thus obtained was preformed with a pressure of 500 MPa using a mold, heated to 300° C. and then immediately extruded at the extrusion ratio of 10: 1 into a bar-like material. In Embodiment 3, a layered deformation structure was formed at the surface portion of each powder at the stage of mechanical alloying, and was extended by extrusion, so that the powders thus extended in the extruding direction overlap each other into a layered deformation structure. Note that since Mg has a melting point of 651° C., Ni 1450° C. and Cr 1890° C., the above-mentioned heating temperature of 300° C. is well within 80% of the melting point of each material. More specifically, for Mg, the above-mentioned 80% temperature is 520.8° C., and the heating temperature of 300° C. is lower than this value.

A hydrogen specimen was obtained from the above-mentioned bar-like material, and H/M and hydrogen desorption temperature were measured by the same method as that of Embodiment 1. The specimen of Embodiment 3 had H/M of 2.5. Moreover, hydrogen desorption was started around 50° C., and the desorption rate was maximized at a temperature in the range of 80° C. to 100° C. About 80% of stored hydrogen had been desorbed at the time the temperature reached 100° C. Moreover, since the hydrogen storage material was started from the powders and thus had been pulverized in advance, pulverization of the hydrogen storage material did not significantly progress even after the repeated hydrogen absorption and desorption.

(Embodiment 4: Cyclic Press)

Using an Mg thin plate, Ni thin plate and Cr thin plate as materials, these plates were combined at the final composition ratio, and uniformly sized and severed. Then, the end of the resultant material was semi-fixed by spot welding. Thereafter, the resultant material was pressed at the pressing force of 800 MPa in a simple mold. The laminated body thus obtained was halved, and the halved laminated bodies were surface-cleaned and then again laminated for pressing. This cycle of pressing, severing, surface cleaning, and formation of the laminated body as a pressed material was repeated 1,000 times, whereby a layered deformation structure was obtained.

In this cyclic press method, the material began to be hardened approximately when the number of repetition times exceeded 200. Then, the material subjected to pressing 1,000 times was kept in 99.99%-pure hydrogen at 500° C. for 24 hours in order to remove oxygen within the material. The hydrogen storage capacity of the resultant material was 3.0 in H/M, but the hydrogen absorption temperature and hydrogen desorption temperature were within 100° C. from the room temperature, and the ratio of the desorption amount to the absorption amount was 80% or more. The reason why the hydrogen absorption temperature and desorption temperature were enabled to be within 100° C. from the room temperature can be considered as follows: Mg having strong affinity to hydrogen was interposed between Ni and Cr, the materials having a different crystal structure therefrom, so that significant lattice distortion was generated in the crystal lattice of Mg, which increased the bond distance between hydrogen and Mg. Note that the heating temperature of 500° C. in the above-mentioned hydrogen annealing is lower than 520.8° C., i.e., 80% of the melting point, 651° C., of Mg.
(Embodiment 5)

The same processing material (starting material) as that of Embodiment 4 was rolled at the rolling reduction ratio of 20% by a rolling mill, and severing, surface cleaning, and formation of the laminated body were repeated 1,000 times. The sample thus obtained was heated to 500° C. in 99.99%-pure hydrogen and kept for 24 hours in order to remove oxygen within the sample. The hydrogen storage capacity of this sample was as high as 2.5 in H/M. The hydrogen absorption temperature and hydrogen desorption temperature were within 90° C. from the room temperature, and the ratio of the desorption amount to the absorption amount was 85% or more.

The reason why the hydrogen absorption temperature and desorption temperature were able to be within 90° C. from the room temperature can be considered as follows: Mg having strong affinity to hydrogen was interposed between Ni and Cr, the materials having a different crystal structure from Mg, so that significant lattice distortion was generated in the crystal lattice of Mg, which increased the bond distance between hydrogen and Mg. Particularly in the case of the rolling, the processing has directionality, so that the crystal lattice of Mg may have been extended in the processing direction.

According to the present invention, a hydrogen storage material having high hydrogen storage capability and also having a hydrogen desorption temperature reduced to about 100° C. can be provided by the method capable of mass production such as rolling. As a result, extensive utilization in the energy-related industries becomes possible including fuel cells and electrode materials of nickel-hydrogen secondary batteries for driving automobiles using a large amount of hydrogen storage material having a low hydrogen desorption temperature, hydrogen-utilizing energy conversion systems, and the like.

Although embodiments of the present invention have been described, the embodiments disclosed above are by way of illustration and example only, and the scope of the present invention is not limited to these embodiments. The scope of the present invention is defined by the appended claims, and includes all modifications within the sense and scope equivalent to the definition of the appended claims.

What is claimed is:

1. A hydrogen storage material, wherein the hydrogen storage material has a layered deformation structure formed in a starting material subjected to plastic deformation, one layer (2) of the layered deformation structure is formed from an alloy or compound including an element of groups 2A, 3A and 4A or an element of at least one of the groups 2A, 3A and 4A, and another layer (3) being in contact with the one layer is formed from an alloy or compound including an element of groups 6A, 7A and 8A or an element of at least one of the groups 6A, 7A and 8A.

2. The hydrogen storage material according to claim 1, wherein the hydrogen storage material has a defect density resulting from such strong deformation working that causes a half-band width of at least one of main diffraction peaks in an X-ray diffraction pattern of the layered deformation structure to be 0.2° or more.

3. The hydrogen storage material according to claim 1, wherein the one layer of the layered deformation structure has a thickness of 10 nm or less.

4. A method for manufacturing a hydrogen storage material, comprising the step of conducting strong deformation working involving plastic deformation to a starting material including: one or more materials selected from alloys or compounds including an element of groups 2A, 3A and 4A or an element of at least one of the groups 2A, 3A and 4A; and one or more materials selected from alloys or compounds including an element of groups 6A, 7A and 8A or an element of at least one of the groups 6A, 7A and 8A.

5. The method for manufacturing a hydrogen storage material according to claim 4, wherein the material subjected to the strong deformation working involving plastic deformation is again laminated and further subjected to strong deformation working involving plastic deformation.

6. The method for manufacturing a hydrogen storage material according to claim 4, wherein the starting material is in a form of powder or pellet, and the strong deformation working involving plastic deformation is mechanical alloying.

7. The method for manufacturing a hydrogen storage material according to claim 4, wherein the strong deformation working involving plastic deformation is conducted in a temperature range corresponding to 80% or less of a melting point of a material selected as the starting material.

8. The method for manufacturing a hydrogen storage material according to claim 4, wherein in the strong deformation working involving plastic deformation, annealing is conducted in a temperature range corresponding to 80% or less of a melting point of a material selected as the starting material.

* * * * *

UNITED STATES PATENT AND TRADEMARK OFFICE
CERTIFICATE OF CORRECTION

PATENT NO.    : 6,329,076 B1
DATED         : December 11, 2001
INVENTOR(S)   : Nozomu Kawabe et al.

It is certified that error appears in the above-identified patent and that said Letters Patent is hereby corrected as shown below:

<u>Column 8,</u>
Line 29, after "width of", replace "0.50" by -- 0.5° --;

<u>Column 9,</u>
Line 53, after "capability" replace "H/N" by -- H/M --.

Signed and Sealed this

Seventeenth Day of September, 2002

Attest:

JAMES E. ROGAN
Attesting Officer
Director of the United States Patent and Trademark Office